G. Steck,
Saw.
No. 104,074. Patented June 7, 1870.
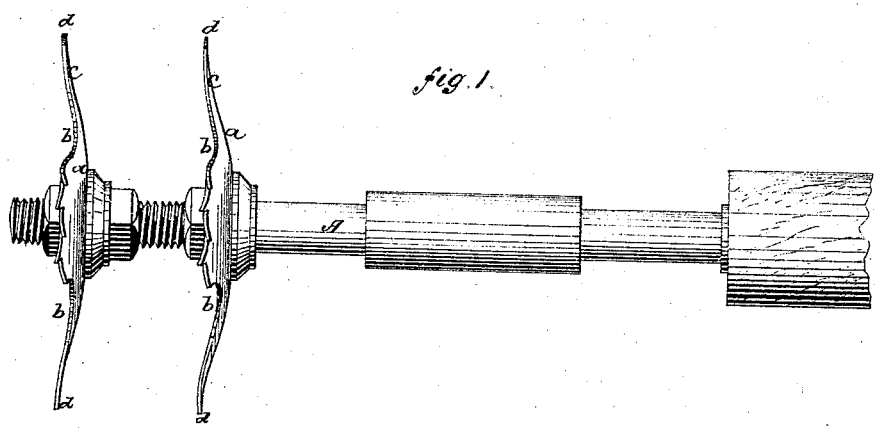
fig. 1.
fig. 2.
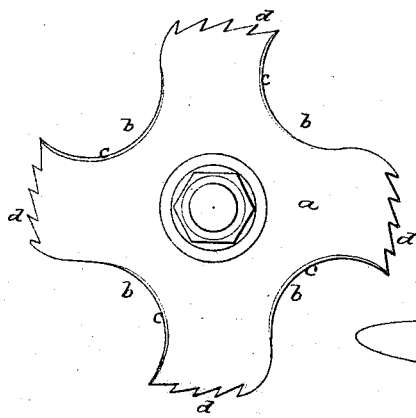
Witnesses:
Victor Hagmann
C. A. Pettit
N. K. Ellsworth
Inventor:
G. Steck
per Munn & Co
Attorneys.
N. PETERS, PHOTO-LITHOGRAPHER, WASHINGTON, D. C.

United States Patent Office.

GEORGE STECK, OF HUGHESVILLE, PENNSYLVANIA.

Letters Patent No. 104,074, dated June 7, 1870.

IMPROVEMENT IN SAW FOR SAWING FELLIES.

The Schedule referred to in these Letters Patent and making part of the same.

To all whom it may concern:

Be it known that I, GEORGE STECK, of Hughesville, in the county of Lycoming and State of Pennsylvania, have invented a new and improved Felly-Saw; and I do hereby declare that the following is a full, clear, and exact description of the same, reference being had to the accompanying drawing forming a part of this specification, in which—

Figure 1 is a side elevation of the two saws on their shaft, and

Figure 2 is a side elevation of one of the saws.

This invention has for its object to saw, out of plank, fellies or other pieces that require to be curved in the direction of their length, and, at the same time, to have straight sides.

The invention consists in a dish or saucer-shaped circular saw, of which two or more are placed on one shaft, and which are of such shape as to give a concavo-convex form, or that of a felly, to any piece of wood that may be passed between them, when such saw is provided with a number of curved notches in its rim, of considerably greater depth and length than its teeth, by which notches the teeth are divided off into separate sections, of equal length, the teeth not conforming to the curvature of the body of the saw, but being all arranged as though upon a plane saw, perpendicular to its axis, by which arrangement the sides of the fellies are cut straight, and when the said notches are furnished with cutting-edges, which smooth the marks of the saw-teeth off the fellies.

In the drawing—

A is the shaft.

a a, the dish-saws.

b, the notches, made at regular intervals in the rim of each saw.

c, the sharpened edges of the notches.

d, the sections of teeth, which are set at the same angles as though they belonged to a saw vertical to its axis.

This arrangement enables the teeth to cut the sides of the fellies straight, that is, perpendicular to each other.

A dish-saw with teeth conforming to its curvature would cut fellies with rounded sides, which would afterward have to be squared off.

The cutting-edges c, one of which follows each section of teeth, dress the sides of the fellies, turning out a finished article at one operation.

The tendency of the teeth d is to cut straight kerfs, and if they were in a continuous row, the saw would be unable to cut curved pieces, notwithstanding its dish-shape. Consequently, the teeth are divided off into sections, with the notches b between, in order to intermit, at regular intervals, the tendency of the teeth to cut straight pieces, and allow the dish-shape of the saw to exercise its natural function of cutting curved pieces.

Having thus described my invention,

What I claim as new, and desire to secure by Letters Patent, is—

1. A dish-saw, provided with notches b in its periphery, at regular intervals, dividing the teeth into sections, when the teeth are set as though upon a plane saw, substantially as described, and for the purpose of cutting curved pieces of wood with straight sides.

2. The notches b, when provided with cutting-edges c, in the manner described, and for the purpose of removing from the fellies the marks of the saw-teeth.

GEORGE STECK.

Witnesses:
CHAS. A. PETTIT,
SOLON C. KEMON.